March 22, 1955

M. M. GUGGENHEIM 2,704,519

CONFECTIONERY MACHINE

Filed Feb. 2, 1951

INVENTOR.
Max M. Guggenheim
BY
Harry Radzinsky
ATTORNEY

March 22, 1955

M. M. GUGGENHEIM 2,704,519

CONFECTIONERY MACHINE

Filed Feb. 2, 1951

INVENTOR.
Max M. Guggenheim
BY
Harry Radzinsky
ATTORNEY

March 22, 1955 M. M. GUGGENHEIM 2,704,519
CONFECTIONERY MACHINE
Filed Feb. 2, 1951 7 Sheets-Sheet 3
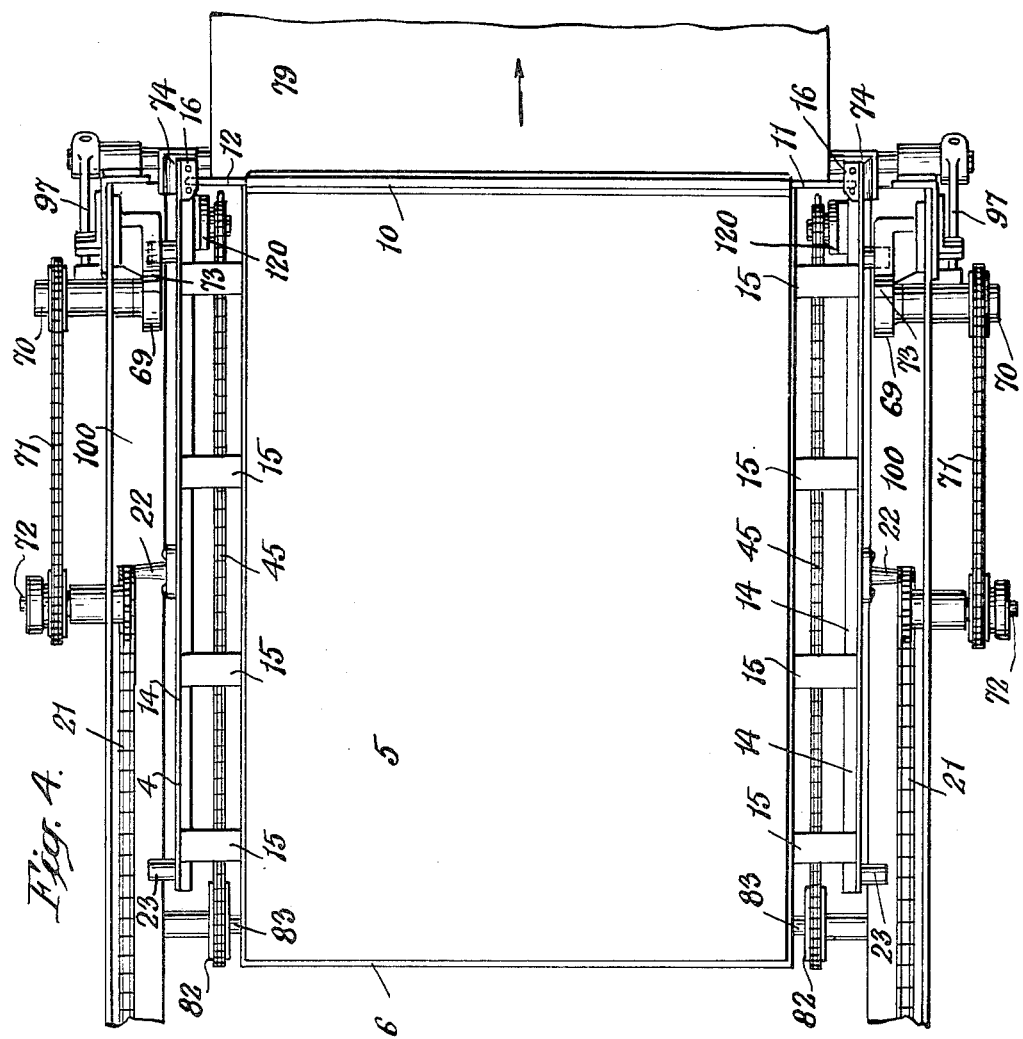
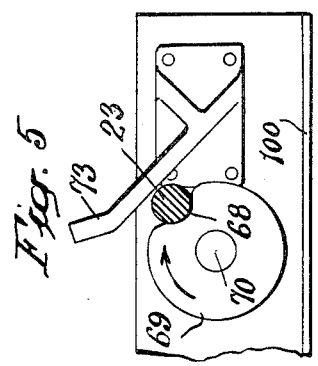
INVENTOR.
Max M. Guggenheim
BY
Harry Radzinsky
ATTORNEY

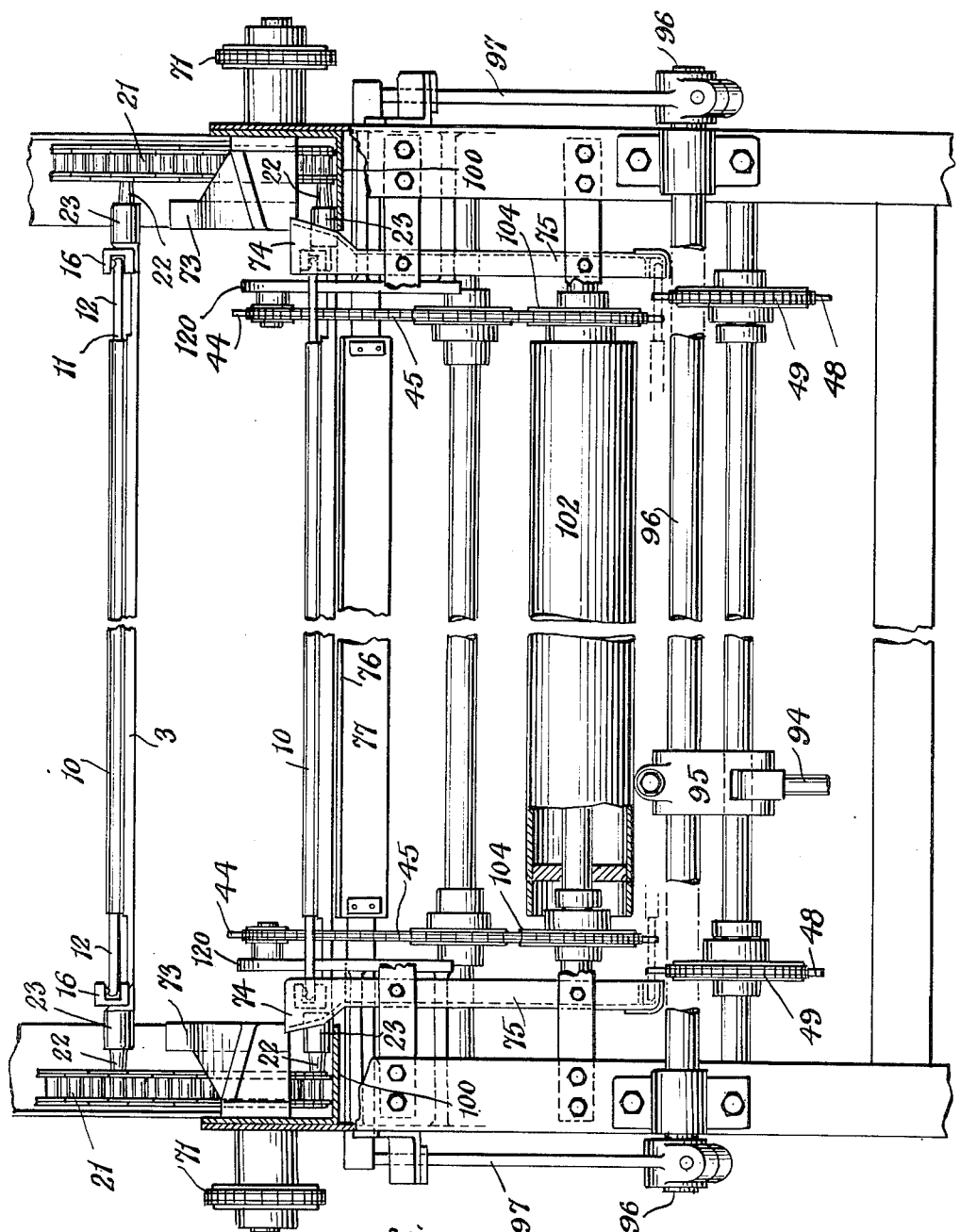

March 22, 1955  M. M. GUGGENHEIM  2,704,519
CONFECTIONERY MACHINE
Filed Feb. 2, 1951  7 Sheets-Sheet 5
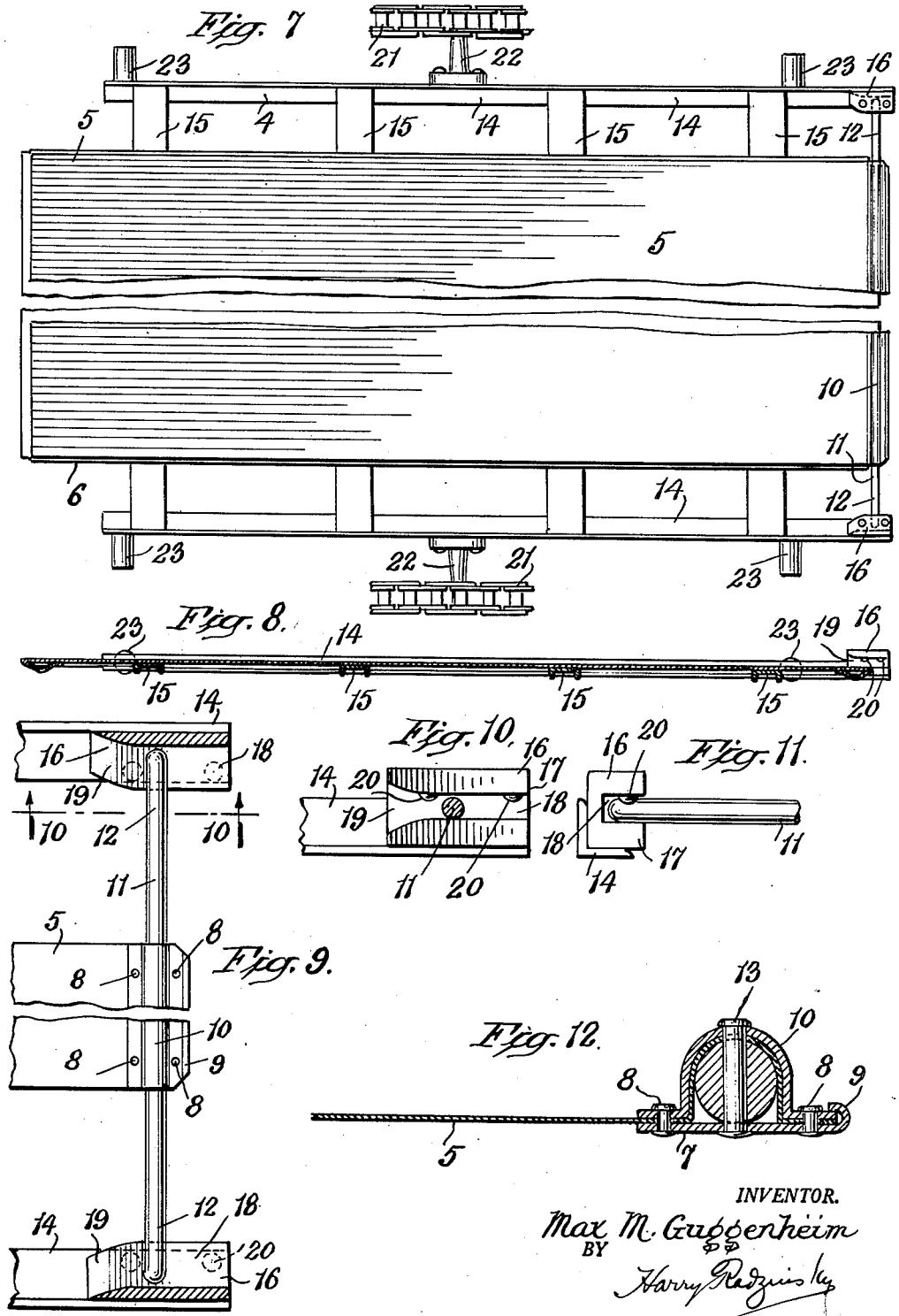
INVENTOR.
Max M. Guggenheim
BY
Harry Radzinsky
ATTORNEY March 22, 1955 M. M. GUGGENHEIM 2,704,519
CONFECTIONERY MACHINE
Filed Feb. 2, 1951 7 Sheets-Sheet 6
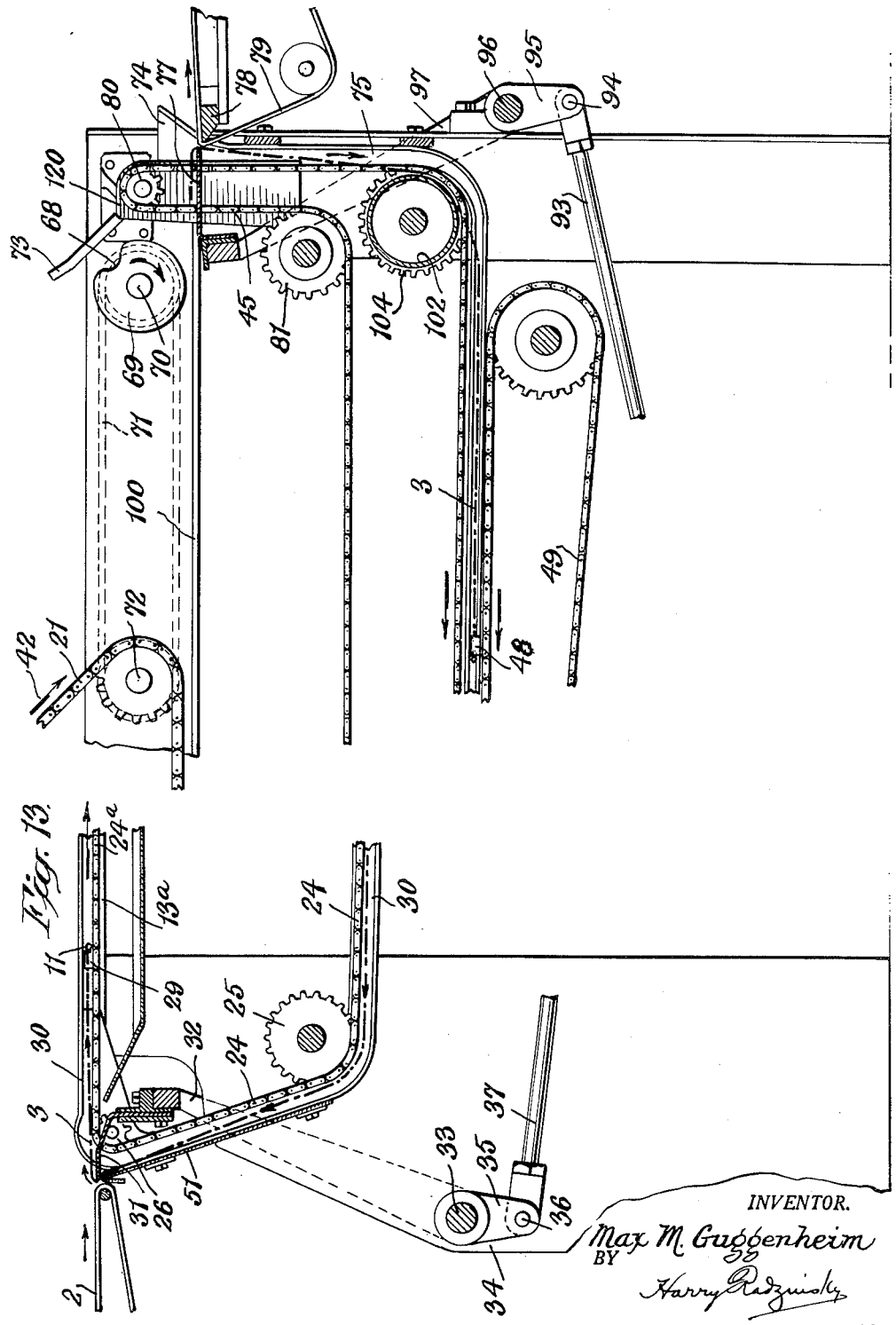
INVENTOR.
Max M. Guggenheim
BY Harry Radzinsky
ATTORNEY March 22, 1955   M. M. GUGGENHEIM   2,704,519
CONFECTIONERY MACHINE
Filed Feb. 2, 1951   7 Sheets-Sheet 7
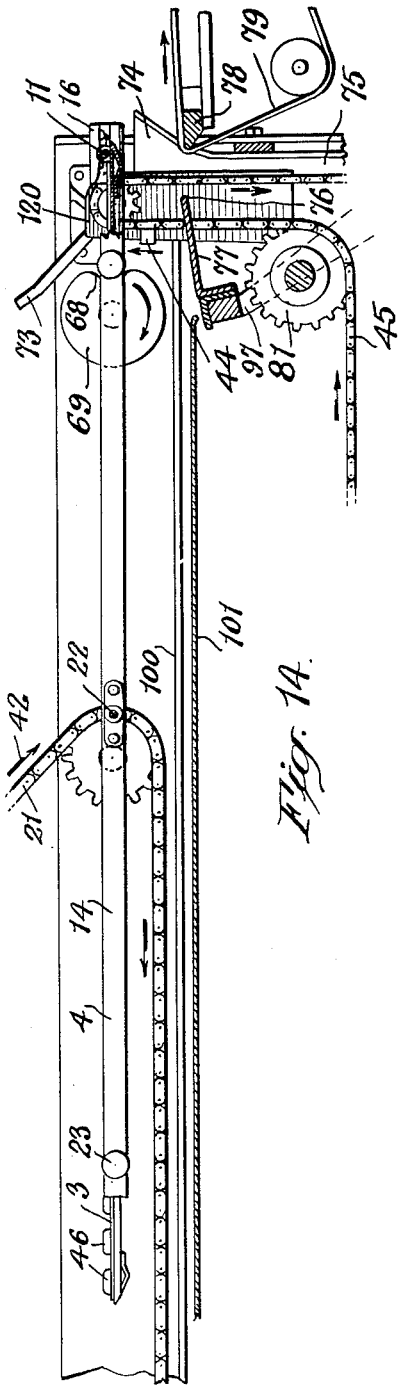
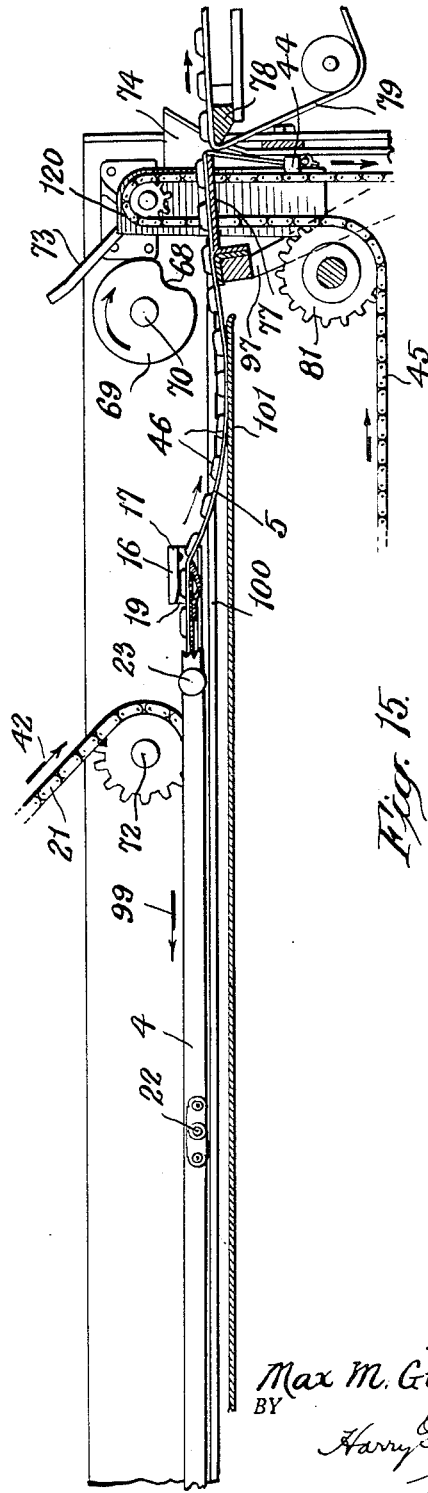
INVENTOR.
Max M. Guggenheim
BY
Harry Redzinsky
ATTORNEY

United States Patent Office 2,704,519
Patented Mar. 22, 1955

2,704,519

CONFECTIONERY MACHINE

Max M. Guggenheim, New York, N. Y., assignor to National Equipment Corporation, New York, N. Y., a corporation of New York Application February 2, 1951, Serial No. 209,126

2 Claims. (Cl. 107—7)

This invention has reference to machines for making candy or confectionery and more particularly the means by which the candies or confections are carried or conveyed for a substantial distance to enable the same to cool or set before being packed in boxes or other containers.

In machines of this character the candies are conveyed from an enrober or coating machine and are received upon a flexible sheet referred to in the trade as a "placque," the placque being carried by a tray which is moved by chains through a lengthy and tortuous path within an enclosure in which the temperature is maintained at a suitable low degree to facilitate cooling and hardening of the candies.

At the end of its travel, each tray is arranged to have the placque which it carries, as well as the candies borne by the placque, moved from off the tray. The candies which leave the placque, and which are at this time hardened or set, are carried off on a conveyor belt adjacent to a packing table where they are removed and packed in boxes. The placque from which the candies have been removed, and which has been stripped from off its tray, is moved downwardly and thence rearwardly to the entrance end of the machine where it is again brought up to receive another supply of candies and then moved to a position upon another tray which again carries the placque through the cycle as above described.

The present invention has for one of its objects, the provision of means for simplifying the placement or positioning of each placque on its supporting tray in a precise, accurate and effective manner; for delivering the candies or confections from each placque, stripping the placque from its tray as it is relieved of the confections, cleaning the placque, and returning the separated trays and placques to the inlet or entry end of the machine for re-use.

It is an object of the invention to provide an improved placque construction; to provide means on each tray for easily engaging a rod at the forward end of the placque to thereby position the placque on the tray and maintain the same properly positioned thereon during the travel of the tray, yet permit ready separation of the placque from the tray at the outlet end of the machine.

The invention also contemplates other constructional elements and means in the machine which aid in the more effective and satisfactory operation of the same as will be hereinafter more specifically pointed out in the specification and set forth in the claims appended hereto.

In the accompanying drawings, wherein an illustrative embodiment of the invention is shown, Fig. 1 is a diagrammatic view illustrating the path of movement of the trays and candy-carrying placques;

Fig. 4 is a top plan view of the outlet end of the machine, with the overhead conveying means omitted to more clearly show one of the trays and placque thereon;

Fig. 5 shows one of the cams and guiding means for causing descent of one of the trays;

Fig. 6 is an end view of the machine, with parts in section, looking at the machine from the right of Fig. 4;

Fig. 7 is a top plan view of one of the trays with the placque supported thereon;

Fig. 8 is a longitudinal sectional view through the tray;

Fig. 9 is a top plan view of one end of a placque showing the rod carried by the same, and the means for engaging the rod to hold the same in position on the tray;

Fig. 10 is a sectional view taken on the line 10—10 of Fig. 9, looking in the direction of the arrows;

Fig. 11 is a view of the structure of Fig. 10, looking at the same from the right;

Fig. 12 is a longitudinal sectional view through one end of the placque and the rod carried by the same;

Fig. 13 is a vertical sectional view through the conveying means in the machine, showing the inlet end at the left and the outlet end at the right;

Fig. 14 is a vertical sectional view through the mechanism at the outlet end of the machine, showing the rod on the placque about to be engaged by conveyor chains and stripped from the tray; and Fig. 15 is a similar view, showing the placque partly stripped from the tray; the candies being moved from the placque onto a conveyor belt and the placque being moved downwardly preparatory to movement to the forward or inlet end of the machine.

Figure 2:
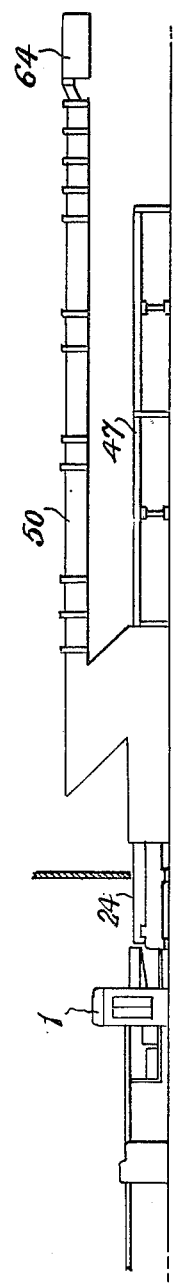
Fig. 2 is a side elevation, diagrammatically showing a machine constructed according to the invention.

In a machine constructed in accordance with the invention, candies or confections are coated or enrobed with a chocolate or other coating by means of an enrober 1 and said coated candies are then received from the chain or link conveyor 2 of the enrober upon a moving placque indicated in dot and dash lines at 3 in Fig. 13, the moving placque being at this time supported on a plate 13a. The candies passing from the conveyor 2 to the placque, are received on the placque as the same is travelling toward a tray generally indicated at 4 in Figs. 2 and 7, the construction of which is disclosed in Figs. 7 and 8. The tray 4 is also moving in the same direction as the placque, but the placque is moved at a greater speed than the tray and overtakes the tray and is deposited thereon and thereafter the placque and tray are moved together as a unit until they become separated at the location where the candies are removed from the placque.

The placque is composed of a sheet of flexible material, such as fabric, plastic or even heavy paper and the construction of one of the placques is more clearly seen in Figs. 9 to 12. The flexible body 5 of the placque is of a size to enable it to almost completely cover the top 6 of the tray 4, and at its forward end the sheet or body 5 of the placque is attached by the rivets 8 to a transversely extending metal strip 7 which extends for the width of the sheet 5. Said strip maintains the sheet flatly and smoothly and is provided at its forward edge with an overturned flange 9 which takes over the forward edge of a channel strip 10 that encloses a substantial portion of a transverse rod 11. Rivets 13 extending through the strips 7 and 10 and through the rod securely maintain the rod in place, with the opposite ends 12 of the rod extending well beyond the longitudinal edges of the sheet 5 as clearly seen in Figs. 7 and 9. The location of the rod 11 within a channel strip 10, with a flange of the strip extending forwardly and stiffening the forward edge of the placque, holds the front end of the placque against folding or curling under during travel and use of the placque.

The trays 4 which support the placques and the confections carried thereon, are of the construction shown in Figs. 7 and 8, wherein it will be noted that each tray is provided with the two longitudinal side bars 14 of angular shape in cross-section, said side bars being maintained in the desired spaced relation by means of the spaced cross pieces 15. The cross-pieces 15 which may be channel-shape in cross section, are attached to the body or flat plate 6 of the tray.

At the forward end of each tray and on the longitudinal side bars 14 thereof, are the retaining elements 16 for the placque. Each of these retaining elements 16 consists of a block 17 formed with a channel or slot 18 extending through it, said channel or slot flaring as shown at 19 at its entry end to facilitate the ready admission of the ends 12 of the rod 11 of the placque into the slot. Spring-pressed locking elements 20 are provided in the slot 19, said locking elements permitting the rod-ends 12 to be readily forced into the slot and thereafter holding the placque against inadvertent shifting movement on the tray until it is desired to remove the placque from the tray in a manner to be later described.

Each of the trays carrying a placque with the candies thereon is moved through a lengthy path of travel by conveyor chains 21 to which each tray is connected at a central point by the lugs 22 fastened to the side bars 14 of the tray. At its opposite ends each of the side bars 14 is provided with guide pins 23 serving to maintain the trays and their contents horizontal or level during all phases of travel of the trays.

Figure 1:
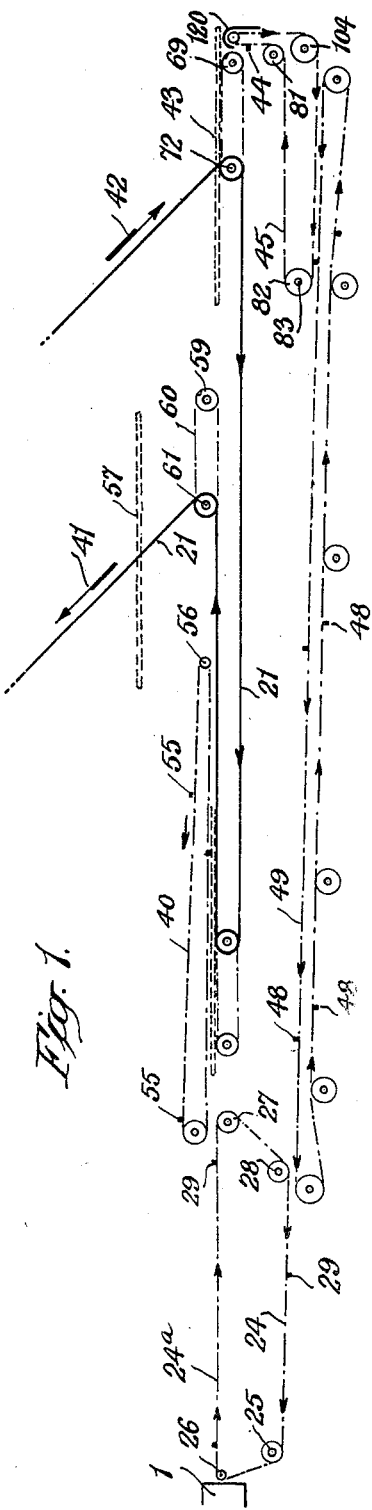

In Fig. 1 of the drawings is diagrammatically shown the travel of the various conveyor chains. The enrober 1 delivers the candies or other confections onto each placque as said placque is brought up to the upper stretch 24a of the conveyor chains 24. The placque carrying the candies is moved along by the chains 24 to a point where its forward movement or that toward the right in Fig. 1, is taken over by chains 40 which move the placque along at a speed greater than the speed of forward movement of the tray 4 by the chains 21. Hence the moving placque overtakes the moving tray adjacent to the right end of the chains 40 at which point the rod 11 of the placque engages in the retainers 16 and the tray, with the placque then carried by it, moves forwardly and is then carried upwardly as indicated by the arrow 41 and moved through a lengthy and tortuous path in a so-called "multiple-tier" conveyor diagrammatically indicated at 50 and then brought downwardly as indicated by the arrow 42 to the position diagrammatically indicated at 43.

As the placque and tray continue their further downward movement, the rod 11 of the placque contacts with cam plates 120 which tend to hold the rod while reverse movement of the tray disengages the rods from the retainers 16, and maintains the rod in position to become engaged by the lugs 44 on chains 45 which draw the placque downwardly while the candies 46 are moved from the placque onto a conveyor belt 79 (Figs. 14 and 15) to the packing table where the same are packed in boxes.

As the rod 11 becomes thus engaged by the cams 120 and held at a point of engagement by the lugs 44, the tray begins its return movement to the left as indicated by the arrow 99, and this causes the retainers 16 to be pulled from off the rod 11 which is then held by the cams 120 in the proper position for engagement by the lugs 44 of the chain 45 to draw the placque downwardly.

The placque which has thus been stripped from the tray and moved downwardly is now engaged by lugs 48 on the moving chains 49 and is moved toward the left to become engaged by the lugs 29 on chains 24 and brought up to the top stretch 24a from which the cycle just described is repeated.

At the left in Fig. 13, the manner in which a placque is moved to position the same on top of a tray and to receive the confections from the conveyor 2, will be seen. The placque shown at 3 in dot and dash lines is moved in the direction of the arrows by means of the continuous chains 24 extending over lower sprockets 25 and upper sprockets 26 at one end and over the sprockets 27 and 28 at the other end. These chains 24 are provided with the projecting lugs 29 in properly spaced relation and adapted to engage behind the projecting end parts 12 of the rod 11 of each placque and draw the placque along guides 30 while the placque is being supported on plate 13a. Adjacent to the exit end of the conveyor 2 is a movable plate 31 carried at the ends of arms 32 on shaft 33 pivoted in the frame 34 of the machine. The arm 35 extending from the shaft 33, is pivotally connected at 36 to the rod 37 extending from suitable cams or other activating mechanism, which rocks the shaft 33 to cause the plate 31 to nearly close the gap between the end of the conveyor 2 and said plate, but only after the rod 11 on the placque has passed between the end of the conveyor 2 and the "knife-edge" at the free end of the plate 31.

When the chains 24 move the placque upwardly, the plate 31 is at first in a retracted or open position so that the spacing between the free or knife edge of the plate and the upper end of the guide plate 51 is sufficiently wide to permit the rod 11 of the placque to pass through said space. The timing of the apparatus is such that immediately after the passage of the rod through said space the arms 32 will be swung toward the left as viewed in Fig. 13, to thereby greatly decrease the spacing between the plates 31 and 51, but allow sufficient spacing for the body of the placque to be drawn through. As the placque is thus moved over the free knife-edge of the plate 31, said plate serves to tension the placque and allows it a smooth and even passage over its edge. The spacing between the conveyor 2 and the edge of the plate 31 is so decreased when the plate is in its closed position that the candies will progress smoothly over the space from the conveyor 2 and onto the placque. The placque, being drawn by the lugs 29, is now moved toward the right until the right-hand end of the upper stretch 24a of the chains 24 is reached. At this point, the forward movement of the placque is taken over by the chain 40 which carries lugs 55, and these lugs engage the end parts 12 of the rod 11 and move the placque along toward the right.

The chains 24 normally move the placque at the same speed as the conveyor 2 is moved from the enrober, but the chains 40 are operated at a greater speed so that when the chains 40 start to move the placque, the movement of the placque is accelerated until it overtakes the tray 4 that is being moved at this time toward the right by the chains 21. At the right hand end of the chains 40, or the location indicated by the sprocket 56 in Fig. 1, the placque has reached the tray and is resting thereon, and becomes connected to the tray by the entry of the ends 12 of the rod 11 through the flared ends 19 of the retainers 16 and into said retainers as shown in Figs. 9, 10 and 11. Thus, at this point, the placque and tray become coupled together, with the placque, bearing the candies, resting on top of the tray as shown in Fig. 7. The placque and tray are thereafter moved together as a unit until the exit end of the apparatus is reached, where the same become separated, as will be described.

Figure 3:
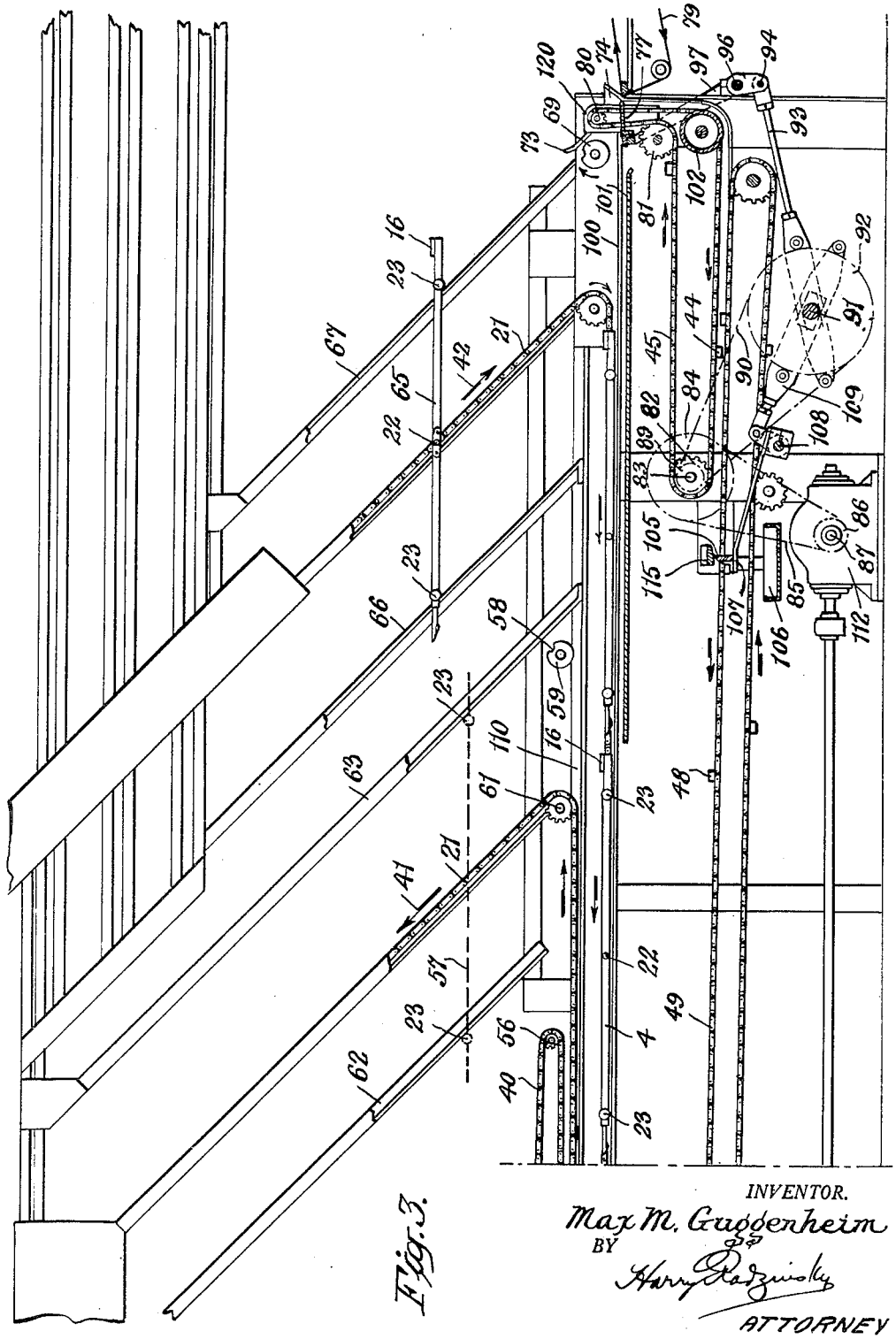
Fig. 3 is a side elevation, with parts in section, of the part of the machine at which the placque-carrying trays ascend to begin travel on a lengthy conveyor for a hardening period and also descend from the conveyor for separation of the placques from the trays.

After the tray and placque become coupled together, with the placque and its load of candies resting on the tray as above described, they are moved along together upon the supporting rails 110, until the chain 21 starts its upward rise as indicated at the arrow 41, whereupon the tray and the placque resting thereupon will start upward as diagrammatically indicated at 57 in Fig. 3. The ascent of the tray is aided by the engagement of the front pins 23 of the tray in the notches 58 in rollers 59 driven by chains 60 (Fig. 1) from the sprocket shaft 61. In its upward climb the tray is held horizontally by the engagement of the pins 23 against the inclined guide rails 62 and 63 in Fig. 3. When the tray and its placque reach the upper end of the rails 62 and 63, the tray and placque are moved horizontally along lengthy rails through a tortuous path in a manner known in this art, which rails and the chains which move the trays along on the same are contained in a housing 50 in which the temperature is uniformly maintained at the required degree by a blower or other cooling device shown at 64.

At the end of their travel through the multiple tier conveying means, the tray and placque begin their descent, such descending tray being shown at 65 in Fig. 3. It will be there noted that the pins 23 of the tray are resting against the inclined guide rails 66 and 67, and the forward pins 23 of the tray engage against the rails 67 until the tray has descended to an extent sufficient to cause said forward pins 23 to engage in the notches 68 in rollers 69 secured on a rotative shaft 70 that is driven by the chains 71 from the sprocket shaft 72 of the conveyor chains 21. This is clearly shown in Fig. 5 wherein it will be noted that the front pins 23 are guided under the inclined guide brackets 73 to thus lower the tray to an extent to enable the end portions 12 of the rod 11 of the placque then resting on the tray, to be engaged by the lugs 44 on the chain 45. Said lugs 44 then draw the rod 11 out of the retainers 16 of the tray and draw the placque down through the flared upper ends 74 of guides 75 and over the knife edge 76 of a plate 77.

The plate 77 is operated similarly to that shown at 31 located at the entrance end of the apparatus. That is to say, the plate 77 will, when in its retracted or open position, be located as shown in Fig. 14 while the rod 11 of the placque is being drawn down between said edge and the edge of the guide piece 78 of the conveyor belt 79. After the rod 11 has passed downwardly beyond the edge 76, the plate 77 is moved to its closed position, or that shown in Fig. 15, leaving a relatively small gap or slot between it and the belt conveyor 79, and through this slot is drawn the body of the placque, while the candies 46 are moved onto the conveyor 47 to be carried to the packing table. The chains 45, of which there are two, with one at each side of the machine, are guided over upper sprockets 80 and pass under sprockets 81 and around the sprockets 82 and 83. The sprockets 82 are on a shaft 83 carrying a sprocket 84 driven by a chain 85 from sprocket 86 on a shaft 87 of a speed-reduction gear-box 112 that is driven by shaft 88 from a motor. Shaft 83 also carries a sprocket 89 engaged by the chain 90 which extends around sprocket 92 on a cam-shaft 91. Said cam-shaft 91 carries suitable cam mechanism acting to operate a link 93 which has its end pivotally attached at 94 to the arm 95 on a rock shaft 96. Said shaft 96 carries the arms 97 at the upper ends of which is attached the plate 77, which plate may, if desired, be transversely curved or perhaps slightly angular similar to the plate 31. It will be obvious that a rocking movement of the shaft 96 by the mechanism just described, and at the proper time, will result in the plate 77 being moved to either the open position, as shown in Fig. 14 or to the closed position shown in Fig. 15, as required.

As the placque is being drawn downwardly through the guides 75 in the manner shown in Fig. 15, and the candies are being delivered from the placque and onto the belt 47, the tray is being moved toward the left or in the direction of the arrow 99 in Fig. 16. While moving in this direction, the tray has its pins 23 supported on rails 100, while the placque, being drawn to the right and thence moved downwardly, is drawn with its candy load over a supporting plate 101, as well as over the plate 77. In its downward movement, the placque is drawn over a roller 102 on a shaft 103 which shaft also carries the sprockets 104 over which the chain 45 extends. As the placque is moved below the roller 102 it is moved horizontally and toward the left by the lower stretch of the chain 45. When the left end of the chains 45 is reached at the sprocket 82, further movement of the placque toward the left is continued by the upper stretch of the chain 48.

While the placque is being moved toward the left as above described, it will be so moved with its face or upper surface directed downwardly and which face is drawn across the edge of a scraper blade 105 to clean the surface of the placque and cause any particles of candy adherent thereto to be directed down into a catch receptacle 106. The scraper blade 105 is directed upwardly toward a cross bar 115. The scraper blade, which can be made of a plastic material, such as "Lucite," for example, is mounted at the end of one or more arms 107 secured on a rock shaft 108 which is rocked by cam means, including the link 109 and a suitable cam on shaft 91. Through this arrangement the blade 105 may be lowered for a suitable distance from the bar 115, to permit passage of the rod 11 of the placque, and then brought up to contact the face of the placque. After passing over the scraper blade and being cleaned thereby the placque continues its movement to the left until it reaches the chains 24 which move it in the direction of the arrows in Fig. 1 and then bring it upwardly and over the edge of the plate 31 with its top face uppermost to repeat the cycle as described.

From the foregoing, the operation of the apparatus will now be readily understood. The candies issuing from the enrober 1 are carried therefrom on the conveyor 2 and are received from said conveyor on the placque 3 that is being then drawn upwardly over the edge of the plate 31 as shown at the left in Fig. 13. The placque carrying the candies continues its movement toward the right, until it is engaged by the lugs 55 on the chains 40, which chains are moving at a greater speed than the chains 21, and as a result the placque overtakes the tray being moved by the latter chains and is coupled to the tray by the engagement of its rod 11 in the retainers 16 and brought to rest on top of the tray. The tray and placque carried thereon are then elevated as indicated by the arrow 41 and carried by the multiple-tier conveying means through the cooling chamber and then brought downwardly as indicated by the arrow 42 to a point where the rod 11 on the placque is engaged by the lugs 44 on the chains 45 and drawn from the retainers 16 on the tray. The candies are then directed from the placque to the belt 79 and the placque is drawn downwardly past the edge 76 of the plate 77, the plate 77 having been moved to its closed position after the rod on the placque has been moved past it. Reaching the lower stretch of the chain 45, the placque has its rod 11 engaged by the lugs 48 on the chain 49 which move the placque over the scraper blade 105 to clean the placque, and the placque is then carried to the point where it is engaged by the lugs 29 on the chains 24 and finally brought upwardly by said chains over the edge of the plate 31 to repeat the cycle as just described.

Having described one embodiment of the invention, it is obvious that the same is not to be restricted thereto, but is broad enough to cover all structures coming within the scope of the annexed claims.

What I claim is:

1. In a machine of the character described in which a placque having a rod at one end is transported by a tray, cam elements constituting fixed abutments behind which the rod on the placque is brought by movement of the tray, said cam elements engaging against the rod and holding the placque against movement while the tray is moved in a direction away from the placque, conveying means for engaging the rod and moving the placque away from the fixed cam elements, fixed and movable parts between which the placque is drawn by said conveying means after the placque is separated from the tray, the movable part consisting of a plate presenting an edge against the placque as the placque is moved over it, and means for swingably mounting the plate to cause the same to be moved through an arc to thereby increase or decrease the spacing between its edge and the fixed part as required to permit passage of portions of the placque between said fixed and movable parts.

2. In a machine of the character described, a tray on which a placque is supported, said placque having a rod secured at one end, the rod having end parts projecting beyond the side edges of the tray, means for moving the tray with the placque thereon, a pair of spaced, upstanding, stationary plates positioned to enter behind the end portions of the rod on travel of the tray and hold the placque stationary while the tray is moved from below the placque, conveyor means operative between the plates to engage the end portions of the rod at the forward edges of the plates and move the rod and the placque downwardly, movable and stationary members defining a space between them and through which the placque is moved, and means for moving said movable member to thereby regulate the spacing between it and the fixed member to permit passage of the rod between them and thereafter permit passage of the placque that is trailed after the rod.

References Cited in the file of this patent

UNITED STATES PATENTS

| Number | Name | Date |
|---|---|---|
| 834,037 | Arthur | Oct. 23, 1906 |
| 1,672,522 | Greer | June 5, 1928 |
| 1,721,224 | Koehler | July 16, 1929 |
| 1,732,228 | Greer | Oct. 22, 1929 |
| 1,807,338 | Greer | May 26, 1931 |
| 2,184,189 | Howard | Dec. 19, 1939 |
| 2,197,327 | Tunley | Apr. 16, 1940 |
| 2,403,249 | Tunley | July 2, 1946 |
| 2,443,868 | Pointon | June 22, 1948 |
| 2,488,104 | Tunley | Mar. 15, 1949 |
| 2,520,073 | Tunley | Aug. 22, 1950 |
| 2,575,278 | Kearney | Nov. 13, 1951 |